US010976639B2

(12) United States Patent
Tseng et al.

(10) Patent No.: US 10,976,639 B2
(45) Date of Patent: Apr. 13, 2021

(54) LENS ASSEMBLY DRIVING MODULE AND ELECTRONIC DEVICE

(71) Applicant: LARGAN DIGITAL CO., LTD., Taichung (TW)

(72) Inventors: Te-Sheng Tseng, Taichung (TW); Ming-Ta Chou, Taichung (TW); Wen-Hung Hsu, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 16/663,502

(22) Filed: Oct. 25, 2019

(65) Prior Publication Data

US 2020/0209711 A1    Jul. 2, 2020

(30) Foreign Application Priority Data

Dec. 28, 2018 (TW) ................................ 107147862

(51) Int. Cl.
| | |
|---|---|
| *G03B 3/10* | (2021.01) |
| *H04N 5/225* | (2006.01) |
| *G03B 11/04* | (2021.01) |
| *G02B 7/04* | (2021.01) |

(52) U.S. Cl.
CPC .............. *G03B 3/10* (2013.01); *G03B 11/043* (2013.01); *H04N 5/2253* (2013.01); *H04N 5/2254* (2013.01); *G02B 7/04* (2013.01)

(58) Field of Classification Search
None
See application file for complete search history.

(56) References Cited

U.S. PATENT DOCUMENTS

| | | | |
|---|---|---|---|
| 8,953,096 B2 | 2/2015 | Oh | |
| 9,063,275 B2 | 6/2015 | Park | |
| 9,081,205 B2 | 7/2015 | Kim et al. | |
| 9,151,963 B2 | 10/2015 | Sato et al. | |
| 9,575,329 B2 | 2/2017 | Kim et al. | |
| 9,762,785 B2 | 9/2017 | Kim et al. | |
| 9,778,481 B2 | 10/2017 | Sato et al. | |
| 9,791,661 B2 | 10/2017 | Hayashi et al. | |
| 9,810,917 B2 | 11/2017 | Hubert et al. | |
| 9,854,144 B2 | 12/2017 | Park et al. | |

(Continued)

FOREIGN PATENT DOCUMENTS

TW        M509915 U      10/2015

*Primary Examiner* — William B Perkey
(74) *Attorney, Agent, or Firm* — McClure, Qualey & Rodack, LLP

(57) ABSTRACT

A lens assembly driving module includes a base, a cover, a lens carrier and a damping agent. The cover is coupled to the base. The lens carrier is integrally formed with a plastic barrel into a coaxial unitary element which has an internal space for receiving at least one optical lens element and includes at least two protrusion portions located on one end of the coaxial unitary element close to the base. The damping agent is filled between the base and each of the protrusion portions. The protrusion portions are a part of the coaxial unitary element, and a distance in a direction perpendicular to an optical axis between the part of the coaxial unitary element and the internal space is a maximum distance among distances in the direction perpendicular to the optical axis between other parts of the coaxial unitary element and the internal space.

17 Claims, 13 Drawing Sheets

(56) References Cited

U.S. PATENT DOCUMENTS

| | | | |
|---|---|---|---|
| 9,857,555 B2 | 1/2018 | Lee et al. | |
| 9,869,881 B2 | 1/2018 | Hubert et al. | |
| 9,891,445 B1 | 2/2018 | Miller et al. | |
| 9,933,589 B2 | 4/2018 | Lo et al. | |
| 2017/0023764 A1 | 1/2017 | Chou | |
| 2017/0146771 A1 | 5/2017 | Ho et al. | |
| 2017/0299839 A1 | 10/2017 | Weng et al. | |
| 2018/0011283 A1 | 1/2018 | Hayashi et al. | |
| 2018/0335601 A1* | 11/2018 | Hu | G03B 3/10 |
| 2019/0004279 A1* | 1/2019 | Park | G02B 7/09 |
| 2019/0346656 A1* | 11/2019 | Ho | G02B 7/09 |
| 2020/0033700 A1* | 1/2020 | Wu | G03B 5/04 |
| 2020/0200995 A1* | 6/2020 | Lee | G02B 7/09 |
| 2020/0209711 A1* | 7/2020 | Tseng | H04N 5/2253 |
| 2020/0249493 A1* | 8/2020 | Yang | H04N 5/23287 |
| 2020/0333558 A1* | 10/2020 | Wu | G02B 7/09 |

\* cited by examiner

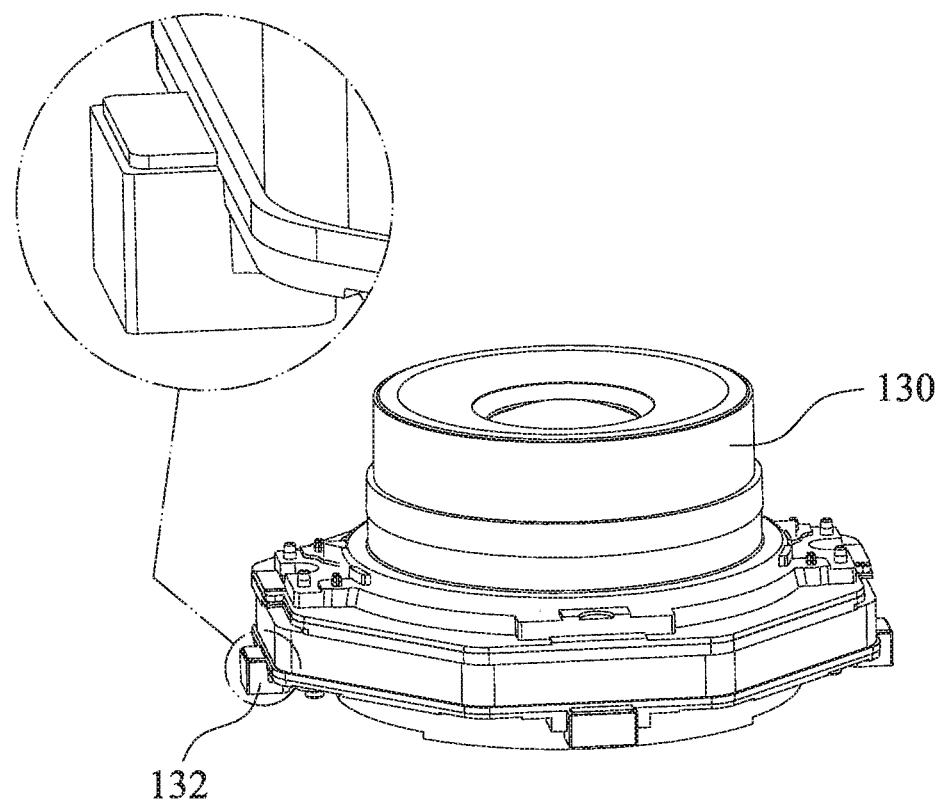
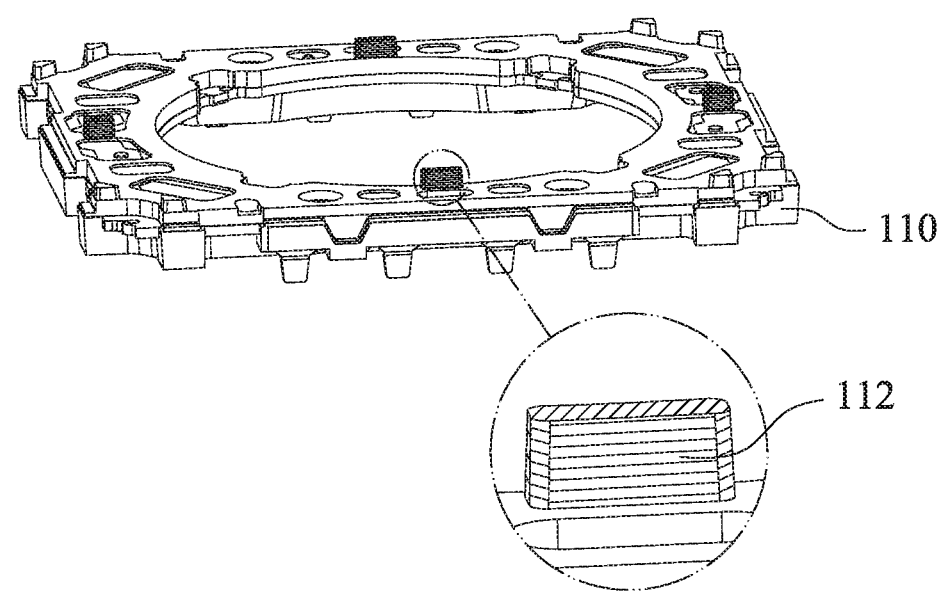
Fig. 4

LENS ASSEMBLY DRIVING MODULE AND ELECTRONIC DEVICE

RELATED APPLICATIONS

This application claims priority to Taiwan Application Serial Number 107147862, filed Dec. 28, 2018, which is herein incorporated by reference.

BACKGROUND

Technical Field

The present disclosure relates to a lens assembly driving module. More particularly, the present disclosure relates to a lens assembly driving module providing auto-focusing functions applicable to portable electronic devices.

Description of Related Art

In recent years, portable electronic devices have developed rapidly. For example, intelligent electronic devices and tablets have been filled in the lives of modern people, and camera module mounted on portable electronic devices has also prospered. However, as technology advances, the quality requirements of camera modules are becoming higher and higher. Therefore, in addition to the improvement in optical design, the camera module needs to be improved in manufacturing precision.

FIG. 10 is a schematic view of a lens barrel 10 and a carrier 20 of a conventional lens assembly driving module which is applicable to a camera module. In FIG. 10, according to the conventional lens assembly driving module, the carrier 20 which is for receiving and driving the lens barrel 10 has threaded structure 21 located on an inner side thereof, thus the lens barrel 10 is threaded to the carrier 20. However, the assembling process would be further complicated since the lens barrel 10 is threaded to the carrier 20, and the assembling tolerance would be generated easily and then the yield rate of the assembling is hard to increase.

SUMMARY

According to one aspect of the present disclosure, a lens assembly driving module includes a base, a cover, a lens carrier and a damping agent. The base has a central opening and includes at least two upright wall structures surrounding the central opening. The cover is coupled to the base and has an opening, the opening corresponds to the central opening of the base. The lens carrier is integrally formed with a plastic barrel into a coaxial unitary element, wherein the coaxial unitary element has an internal space for receiving at least one optical lens element, and the coaxial unitary element includes at least two protrusion portions located on one end of the coaxial unitary element close to the base. The damping agent is filled between each of the at least two upright wall structures and each of the at least two protrusion portions. The at least two protrusion portions are a part of the coaxial unitary element, and a distance in a direction perpendicular to an optical axis between the part of the coaxial unitary element and the internal space is a maximum distance among distances in the direction perpendicular to the optical axis between other parts of the coaxial unitary element and the internal space.

According to another aspect of the present disclosure, an electronic device includes the lens assembly driving module of the aforementioned aspect.

According to another aspect of the present disclosure, a lens assembly driving module includes a base, a cover, a lens carrier and a damping agent. The base has a central opening. The cover is coupled to the base and has an opening, the opening corresponds to the central opening of the base. The lens carrier is integrally formed with a plastic barrel into a coaxial unitary element, wherein the coaxial unitary element has an internal space for receiving at least one optical lens element, and the coaxial unitary element includes at least three protrusion portions located on one end of the coaxial unitary element close to the base, and each of the protrusion portions includes a gate structure. The damping agent is filled between the base and one surface of each of the protrusion portions. The at least three protrusion portions are a part of the coaxial unitary element, and a distance in a direction perpendicular to an optical axis between the part of the coaxial unitary element and the internal space is a maximum distance among distances in the direction perpendicular to the optical axis between other parts of the coaxial unitary element and the internal space.

BRIEF DESCRIPTION OF THE DRAWINGS

The present disclosure can be more fully understood by reading the following detailed description of the embodiment, with reference made to the accompanying drawings as follows:

FIG. 4 is a three-dimensional view of the coaxial unitary element and the base according to 1st example of FIG. 1.

DETAILED DESCRIPTION

Figure 1:
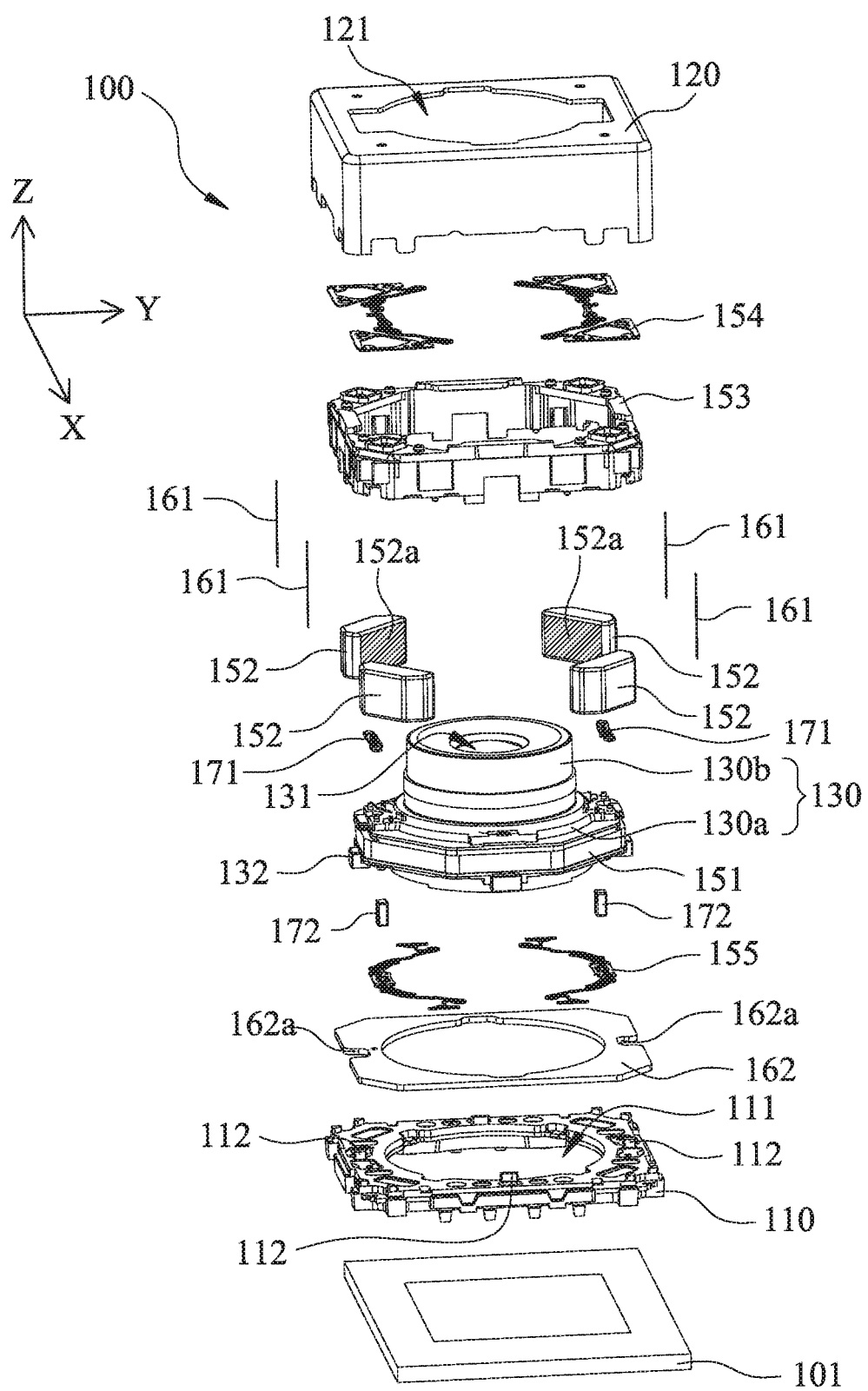
FIG. 1 is an exploded view of a lens assembly driving module according to 1st example of the present disclosure.

According to one embodiment of the present disclosure, a lens assembly driving module includes a base, a cover, a lens carrier and a damping agent. The base has a central opening and includes at least two upright wall structures surrounding the central opening. The cover is coupled to the base and has an opening, the opening corresponds to the central opening of the base. The lens carrier is integrally formed with a plastic barrel into a coaxial unitary element, wherein the coaxial unitary element has an internal space for receiving at least one optical lens element. The coaxial unitary element includes at least two protrusion portions located on one end of the coaxial unitary element close to the base. The damping agent is filled between each of the at least two upright wall structures and each of the at least two protrusion portions. The at least two protrusion portions are a part of the coaxial unitary element, and a distance in a direction perpendicular to an optical axis between the part of the coaxial unitary element and the internal space is a maximum distance among distances in the direction perpendicular to the optical axis between other parts of the coaxial unitary element and the internal space. Therefore, it is favorable for increasing the convenience of applying the damping agent by arranging the protrusion portions on the coaxial unitary element, and reducing the distance between the coaxial unitary element and the base by correspondingly arranging the upright wall structures on the base so as to adjust the step for applying the damping agent. By applying the damping agent to the upright wall structures firstly and then correspondingly connecting to the protrusion portions, the unnecessary resonance of the coaxial unitary element can be reduced.

Each of the at least two upright wall structures can be stripe-shaped, the at least two upright wall structures can have an even height, and located on one side of the base facing toward the coaxial unitary element. Therefore, the structure of the base can be recognizable, so that applicability of the automatic production can be enhanced and the contact area between the base and the damping agent can be increased.

A number of the protrusion portions can be at least three, and each of the protrusion portions includes a gate structure. Due to the protrusion portions are the structure on the coaxial unitary element being farthest from the internal space, the injection mode corresponding to the arrangement can be applied along an identical direction from the outermost part to the internal part. Therefore, it is favorable for enhancing the quality of the injection molding by increasing the uniformity of the flowing direction of the plastic material.

The gate structure of each of the protrusion portions includes a recess structure and a gate trace, and the recess structure surrounds the gate trace. Therefore, it is favorable for designing the entire mold of the injection molding by arranging the recess structure with proper size which can be cooperated to proper injection paths. Furthermore, all of the gate structures can face toward the base. Hence, it is favorable for simplifying the complexity of mold design by arranging the aforementioned injection paths into the same direction.

The lens assembly driving module can further include a focusing driving assembly for driving the coaxial unitary element to move along the optical axis. The focusing driving assembly can include a focusing coil, at least one permanent magnet, a magnet bracket, an upper spring leaf and a lower spring leaf. The focusing coil is connected on the coaxial unitary element. The permanent magnet has a first surface facing toward the focusing coil. The magnet bracket surrounds the coaxial unitary element and is for positioning the permanent magnet. The upper spring leaf is disposed on one end of the magnet bracket close to the cover along the optical axis. The lower spring leaf is disposed on the other end of the magnet bracket close to the base along the optical axis. The upper spring leaf and the lower spring leaf are respectively connected to the coaxial unitary element, and are for supporting the coaxial unitary element to be moved along a direction parallel to the optical axis. Therefore, it is favorable for achieving the compact space arrangement as so to reduce the waste of superfluous space and avoid the unnecessary elements to be used.

The focusing coil can be connected to the end of the coaxial unitary element close to the base. Therefore, the height requirement which cannot be reduced can be maintained in the coaxial unitary element so as to avoid the unnecessary space to be occupied by the elements except for the coaxial unitary element, and it is favorable for reducing the entire height of the lens assembly driving module.

The lens assembly driving module can further include an optical image stabilizable assembly for driving the focusing driving assembly to move along at least one of a second direction and a third direction which are perpendicular to the optical axis, wherein the second direction and the third direction are perpendicular to each other. The optical image stabilizable assembly can include a plurality of suspension wires and an optical image stabilizable coil (OIS). One end of each of the suspension wires is connected to the upper spring leaf, the other end of each of the suspension wires is connected to the base. The optical image stabilizable coil is disposed on one end of the base facing toward the coaxial unitary element. The permanent magnet has a second surface, the second surface faces toward the base, and the optical image stabilizable coil faces toward the second surface. The suspension wires can be made of conductive metal or alloy thereof. The conductive path of the optical image stabilizable coil can be conducted to the exterior via the suspension wires, so that extra mechanical element can be decreased and the complexity of the mechanical design can be reduced which is favorable for the compactness of the lens assembly driving module. Therefore, the optical image stabilizable coil can be made of Flexible Printed Circuit-board (FPC) due to reduce the complexity of the mechanical design, and the optical image stabilizable coil would not be limited to be made by winding the conducting wire. Thus, the smooth degree of the optical image stabilizable coil can be enhanced so as to avoid rough assembling cause by several optical image stabilizable coil, and the amount of the optical image stabilizable coil can be singularized so as to effectively simplify the assembling steps of the lens assembly driving module and enhance the production efficiency. Furthermore, it is favorable for reducing the amount of the permanent magnet by sharing the permanent magnet from the focusing coil and the optical image stabilizable coil so as to enhance the efficiency of the space utilization.

The optical image stabilizable coil can include a plurality of notch structures, which are corresponding to the at least two upright wall structures. Therefore, the optical image stabilizable coil can be aligned to the base via the notch structures and the upright wall structures, so that it is favorable for properly adjusting the corresponding position of the optical image stabilizable coil and the permanent magnet and further enhancing the utilizing efficiency of the upright wall structures by the arrangement thereof.

According to another embodiment of the present disclosure, a lens assembly driving module includes a base, a cover, a lens carrier and a damping agent. The base has a central opening. The cover is coupled to the base and has an opening, the opening corresponds to the central opening of the base. The lens carrier is integrally formed with a plastic barrel into a coaxial unitary element, wherein the coaxial unitary element has an internal space for receiving at least one optical lens element. The coaxial unitary element includes at least three protrusion portions located on one end of the coaxial unitary element close to the base, and each of the protrusion portions includes a gate structure. The damping agent is filled between the base and one surface of each of the protrusion portions. The at least three protrusion portions are a part of the coaxial unitary element, and a distance in a direction perpendicular to an optical axis between the part of the coaxial unitary element and the internal space is a maximum distance among distances in the direction perpendicular to the optical axis between other parts of the coaxial unitary element and the internal space. Therefore, it is favorable for adaptively compressing or extending the shape of the damping agent at different focusing position and reducing the unnecessary resonance of the coaxial unitary element by arranging the surfaces on the protrusion portions.

Each of the gate structures can be located on the surface of each of the protrusion portions. Therefore, it is favorable for maintaining the predictability of the flowing direction of the entire plastic material by unifying the flowing direction of the plastic material from one end of the coaxial unitary element close to the base to the other end thereof far from the base. Thus, the lack of injection material or molding flaw, such as clod material can be avoided while the structure of the coaxial unitary element is complicated.

Each of the gate structures includes a recess structure and a gate trace, the recess structure surrounds the gate trace, and a damping agent is applied on the recess structure. Therefore, the position for applying the damping agent can be recognized by the industrial lens element easier, so that the production efficiency and the processing quality of applying the damping agent can be enhanced by increasing the applicability of the automatic production.

The lens assembly driving module can further include a focusing driving assembly for driving the coaxial unitary element to move along the optical axis. The lens assembly driving module can include a focusing coil, at least one permanent magnet, a magnet bracket, an upper spring leaf and a lower spring leaf. The focusing coil is connected on the coaxial unitary element. The permanent magnet has a first surface facing toward the focusing coil. The magnet bracket surrounds the coaxial unitary element and is for positioning the permanent magnet. The upper spring leaf is disposed on one end of the magnet bracket close to the cover along the optical axis. The lower spring leaf is disposed on the other end of the magnet bracket close to the base along the optical axis. The upper spring leaf and the lower spring leaf are respectively connected to the coaxial unitary element, and are for supporting the coaxial unitary element to be moved along a direction parallel to the optical axis. Therefore, it is favorable for achieving the compact space arrangement as so to reduce the waste of superfluous space and avoid the unnecessary elements to be used.

The focusing coil is connected to the end of the coaxial unitary element close to the base. Therefore, the height requirement which cannot be reduced can be maintained in the coaxial unitary element so as to avoid the unnecessary space to be occupied by the elements except for the coaxial unitary element, and it is favorable for reducing the entire height of the lens assembly driving module.

The lens assembly driving module can further include an optical image stabilizable assembly for driving the focusing driving assembly to move along at least one of a second direction and a third direction which are perpendicular to the optical axis, wherein the second direction and the third direction are perpendicular to each other. The optical image stabilizable assembly can include a plurality of suspension wires and an optical image stabilizable coil. One end of each of the suspension wires connected to the upper spring leaf, the other end of each of the suspension wires connected to the base. The optical image stabilizable coil is disposed on one end of the base facing toward the coaxial unitary element. The permanent magnet has a second surface, the second surface faces toward the base, and the optical image stabilizable coil faces toward the second surface. The suspension wires can be made of conductive metal or alloy thereof. The conductive path of the optical image stabilizable coil can be conducted to the exterior via the suspension wires, so that extra mechanical element can be decreased and the complexity of the mechanical design can be reduced which is favorable for the compactness of the lens assembly driving module. Therefore, the optical image stabilizable coil can be made of Flexible Printed Circuitboard (FPC) due to reduce the complexity of the mechanical design, and the optical image stabilizable coil would not be limited to be made by winding the conducting wire. Thus, the smooth degree of the optical image stabilizable coil can be enhanced so as to avoid rough assembling cause by several optical image stabilizable coil, and the amount of the optical image stabilizable coil can be singularized so as to effectively simplify the assembling steps of the lens assembly driving module and enhance the production efficiency. Furthermore, it is favorable for reducing the amount of the permanent magnet by sharing the permanent magnet from the focusing coil and the optical image stabilizable coil so as to enhance the efficiency of the space utilization.

The base can include a plurality of upright wall structures located on one end of the base facing toward the coaxial unitary element. The optical image stabilizable coil can include a plurality of notch structures, which are corresponding to the upright wall structures. Therefore, the optical image stabilizable coil can be aligned to the base via the notch structures and the upright wall structures, so that it is favorable for properly adjusting the corresponding position of the optical image stabilizable coil and the permanent magnet.

Each of the aforementioned features of the lens assembly driving module can be utilized in various combinations for achieving the corresponding effects.

According to another embodiment of the present disclosure, an electronic device includes the lens assembly driving module of the aforementioned embodiment. Therefore, the electronic with image quality and manufacturing stability is provided.

According to the above description of the present disclosure, the following specific examples are provided for further explanation.

1st EXAMPLE

Figure 2:
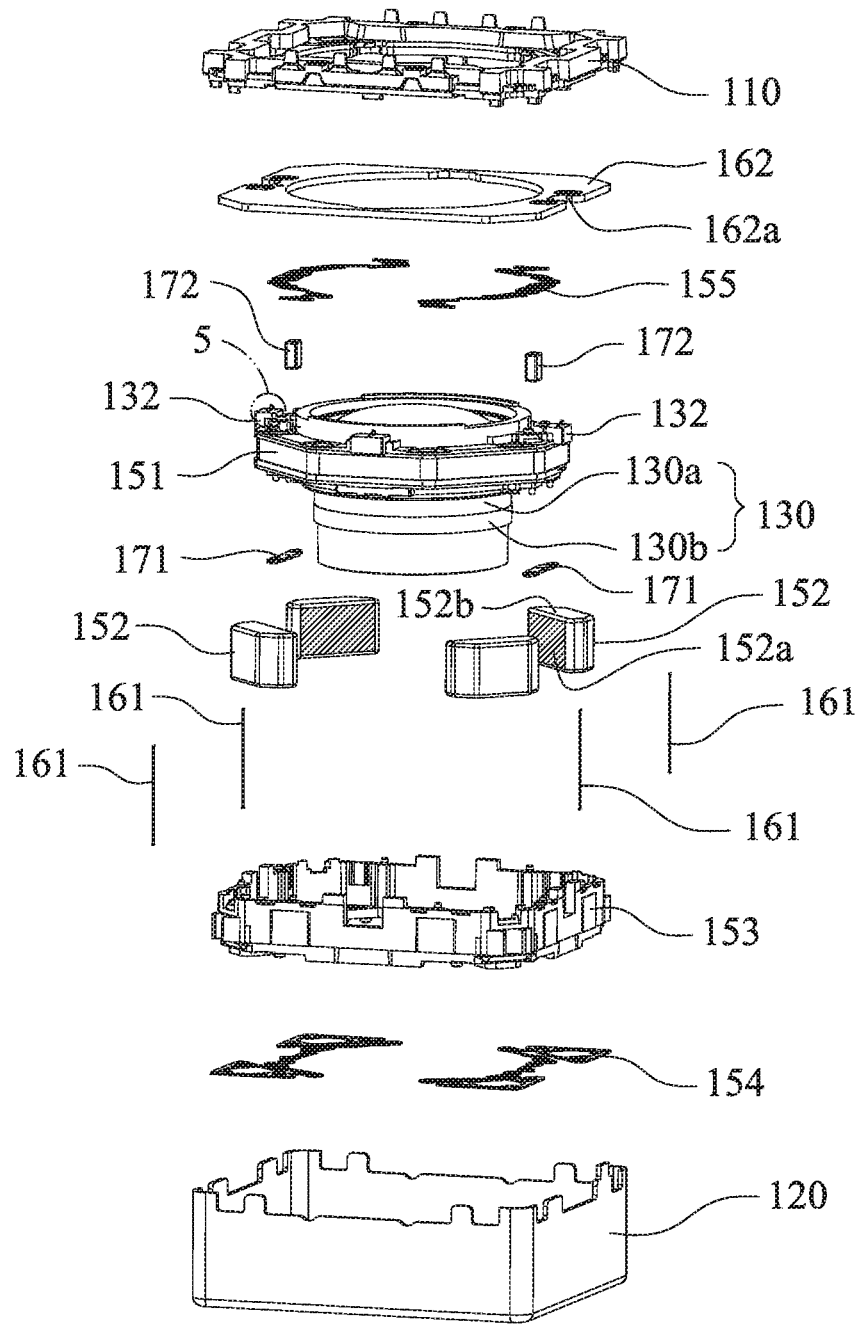
FIG. 2 is another exploded view of the lens assembly driving module according to 1st example of FIG. 1.
Figure 3:
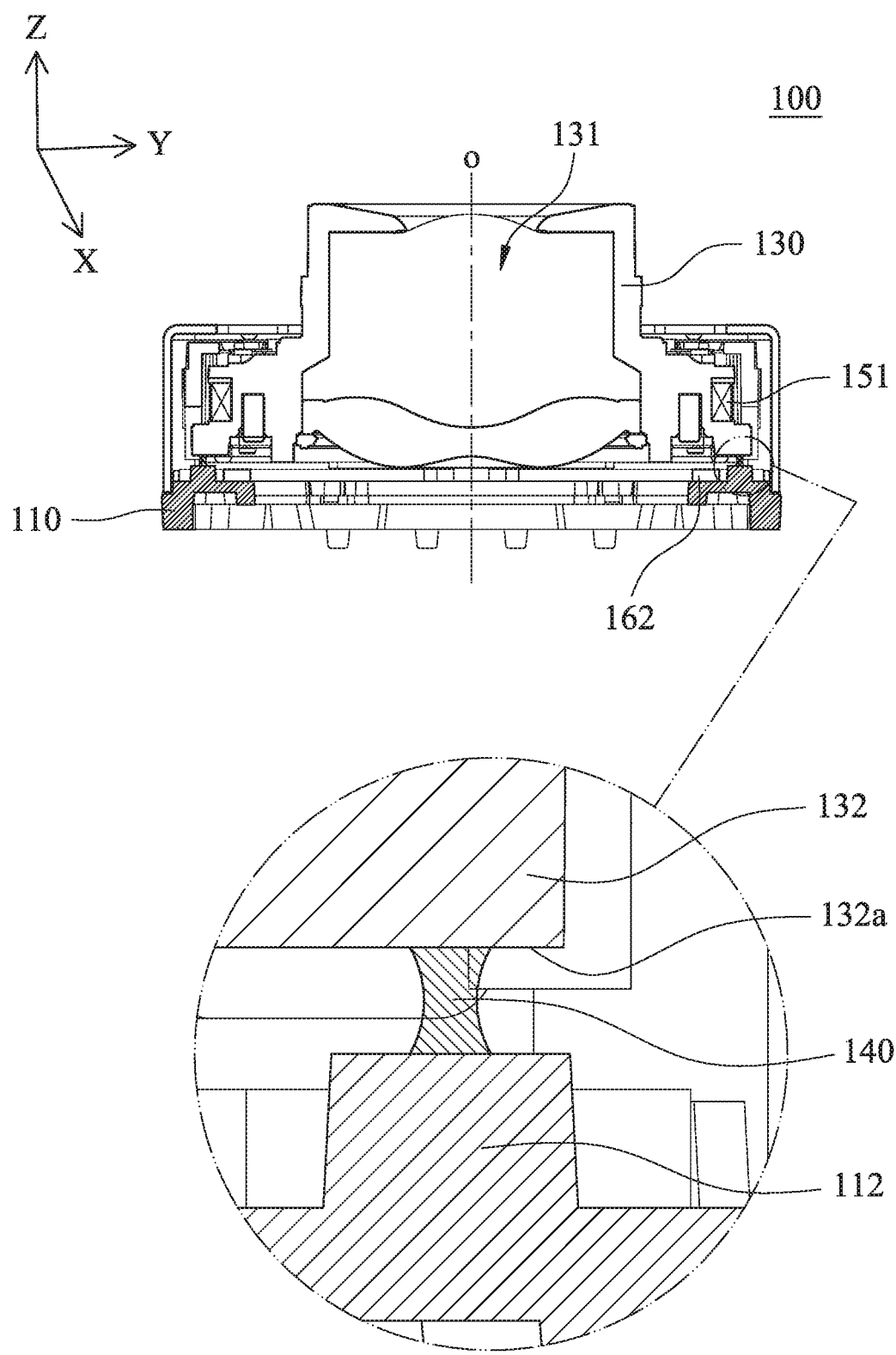
FIG. 3 is a cross-sectional view of the lens assembly driving module which is assembled according to 1st example of FIG. 1.

FIG. 1 is an exploded view of a lens assembly driving module 100 according to 1st example of the present disclosure. FIG. 2 is another exploded view of the lens assembly driving module 100 according to 1st example of FIG. 1. FIG. 3 is a cross-sectional view of the lens assembly driving module 100 which is assembled according to 1st example of FIG. 1. The lens assembly driving module 100 can be applied to a camera module, which is for receiving at least one optical lens element (not shown in drawings) and connected to an imaging element, so as to provide auto-focusing function to the camera module.

In FIG. 1, FIG. 2 and FIG. 3, the lens assembly driving module 100 includes a base 110, a cover 120, a lens carrier 130a and a damping agent 140. The cover 120 is coupled to the base 110. The lens carrier 130a is integrally formed with a plastic barrel 130b into a coaxial unitary element 130 (which is coaxially formed along an optical axis O). The coaxial unitary element 130 is disposed in the cover 120, the damping agent 140 is filled between the coaxial unitary element 130 and the base 110.

The base 110 has a central opening 111, the cover 120 has an opening 121, wherein the opening 121 of the cover 120 corresponds to the central opening 111 of the base 110. The coaxial unitary element 130 has an internal space 131 for receiving at least one optical lens element. FIG. 4 is a three-dimensional view of the coaxial unitary element 130 and the base 110 according to 1st example of FIG. 1. In FIG. 4, the coaxial unitary element 130 includes at least two protrusion portions 132 located on one end of the coaxial unitary element 130 close to the base 110 and extended along the direction which is far from the internal space 131. The protrusion portions 132 are a part of the coaxial unitary element 130, and a distance in a direction perpendicular to the optical axis O between the part of the coaxial unitary element 130 and the internal space 131 is a maximum distance among distances in the direction perpendicular to the optical axis O between other parts of the coaxial unitary element 130 and the internal space 131. That is, the protrusion portions 132 are located the outermost part of the coaxial unitary element 130. Moreover, a number of the protrusion portions 132 can be at least three or a plurality. In the 1st example, the number of the protrusion portions 132 is four, and the present disclosure will not be limited thereto.

Figure 5:
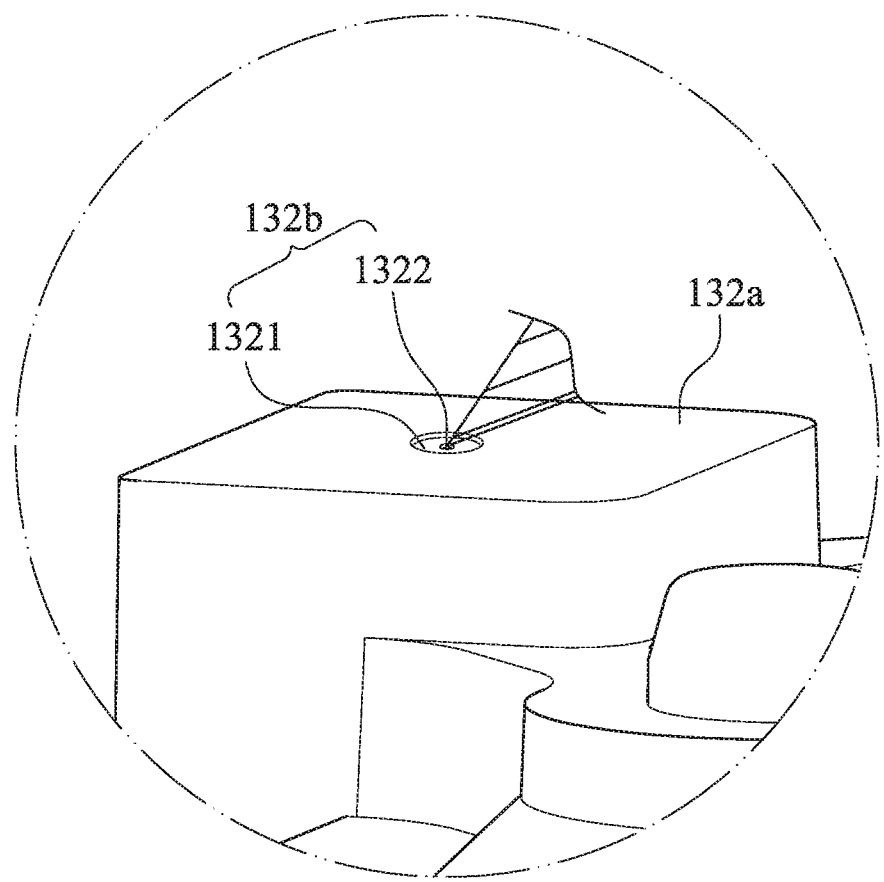
FIG. 5 is an enlarged schematic view of the part 5 in FIG. 2.

In FIG. 3 and FIG. 4, the damping agent 140 is filled between the base 110 and each of the protrusion portions 132. FIG. 5 is an enlarged schematic view of the part 5 in FIG. 2. In order to adaptively compress or extend the shape of the damping agent 140 when the coaxial unitary element 130 is at different focusing positions, so as to reduce the unnecessary resonance of the coaxial unitary element during the auto-focusing process of the lens assembly driving module 100, each of the protrusion portions 132 has a surface 132a, and the damping agent 140 can be filled between the base 110 and the surface 132a of each of the protrusion portions 132.

Further, each of the protrusion portions 132 can include a gate structure 132b, which is located on the surface 132a of each of the protrusion portions 132 and faces toward the base 110. Therefore, it is favorable for avoiding the molding defect by maintaining the flowing direction of the entire plastic material. Each gate structure 132b includes a recess structure 1321 and a gate trace 1322, and the recess structure 1321 surrounds the gate trace 1322. The damping agent 140 is applied to the recess structure 1321. Therefore, it is favorable for recognizing the location for applying the damping agent 140.

The base 110 can include at least two upright wall structures 112, which surrounds the central opening 111. The damping agent 140 can be filled between each upright wall structure 112 and each protrusion portion 132. It is favorable for reducing the distance between the base 110 and the coaxial unitary element 130 by arranging the upright wall structures 112 on the base 110 corresponding to the protrusion portions 132. Moreover, the applying process of the damping agent 140 can be adjusted, such as applying the damping agent 140 to the upright wall structures 112 firstly and then corresponding to the protrusion portions 132, so that the unnecessary resonance of the coaxial unitary element 130 can be reduced. In detail, each of the upright wall structures 112 is stripe-shaped, the upright wall structures 112 have an even height, and located on one side of the base 110 facing toward the coaxial unitary element 130. Moreover, a number of the upright wall structures 112 can be at least three or a plurality. In the 1st example, the number of the upright wall structures 112 is four, and the present disclosure will not be limited thereto.

In FIG. 1, FIG. 2 and FIG. 3, the lens assembly driving module 100 can further include a focusing driving assembly (its reference numeral is omitted) for driving the coaxial unitary element 130 to move along the optical axis O so as to provide the auto-focusing function. The focusing driving assembly includes a focusing coil 151, at least one permanent magnet 152, a magnet bracket 153, an upper spring leaf 154 and a lower spring leaf 155. The focusing coil 151 is connected on the coaxial unitary element 130, which can be surrounded and connected on an outer surface of the coaxial unitary element 130. The permanent magnet 152 has a first surface 152a facing toward the focusing coil 151. The magnet bracket 153 surrounds the coaxial unitary element 130 and is for positioning the permanent magnet 152, wherein the magnet bracket 153 can be positioned in the cover 120. The upper spring leaf 154 is disposed on one end of the magnet bracket 153 close to the cover 120 along the optical axis O. The lower spring leaf 155 is disposed on the other end of the magnet bracket 153 close to the base 110 along the optical axis O. The upper spring leaf 154 and the lower spring leaf 155 are respectively connected to the coaxial unitary element 130, and are for supporting the coaxial unitary element 130 to be moved along a direction parallel to the optical axis O. Therefore, it is favorable for achieving the compact space arrangement and maintaining the stability of the auto-focusing. Furthermore, the focusing coil 151 is connected to the end of the coaxial unitary element 130 close to the base 110. Moreover, the lens assembly driving module 100 can further include a plurality of auxiliary assembling element 171 which are for assisting the assembling of the upper spring leaf 154 and the coaxial unitary element 130 and the electrical connection of the upper spring leaf 154 and the focusing coil 151.

Further, the lens assembly driving module 100 can further include an optical image stabilizable assembly (its reference numeral is omitted) for driving the focusing driving assembly to move along at least one of a second direction (along Y-direction) and a third direction (along X-direction) which are perpendicular to the optical axis O, wherein the second direction and the third direction are perpendicular to each other. The optical image stabilizable assembly can include a plurality of suspension wires 161 and an optical image stabilizable coil 162. One end of each of the suspension wires 161 is connected to the upper spring leaf 154, the other end of each of the suspension wires 161 is connected to the base 110. The optical image stabilizable coil is disposed on one end of the base 110 facing toward the coaxial unitary element 130. The permanent magnet 152 has a second surface 152b, the second surface 152b faces toward the base 110, and the optical image stabilizable coil 162 faces toward the second surface 152b.

In order to properly adjust the corresponding position between the optical image stabilizable coil 162 and the permanent magnet 152, the optical image stabilizable coil 162 can further include a plurality of notch structures 162a, which corresponds to the upright wall structures 112 of the base 110; that is, when the optical image stabilizable coil 162 is disposed on the base 110, the notch structures 162a and the upright wall structures 112 can be aligned to each other, so that the upright wall structures 112 are favorable for providing further advantages.

Moreover, the lens assembly driving module 100 can further include a plurality of focusing feedback signal magnets 172, which are cooperated with a sensing element, so as to detect and control a focusing position signal of the coaxial unitary element 130.

2nd EXAMPLE

Figure 6A:
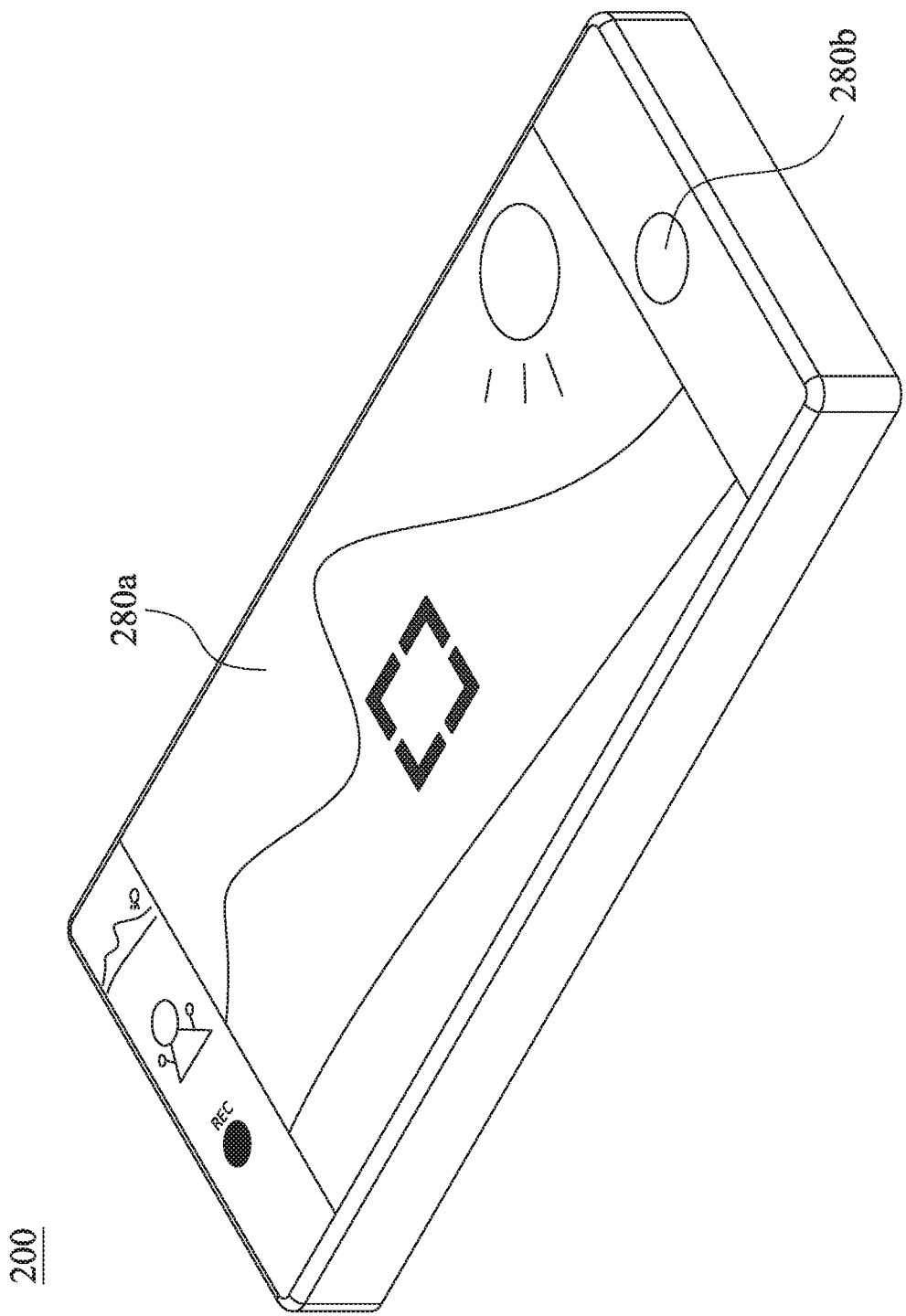
FIG. 6A shows a schematic view of an appearance of an electronic device according to the 2nd example of the present disclosure.
Figure 6B:
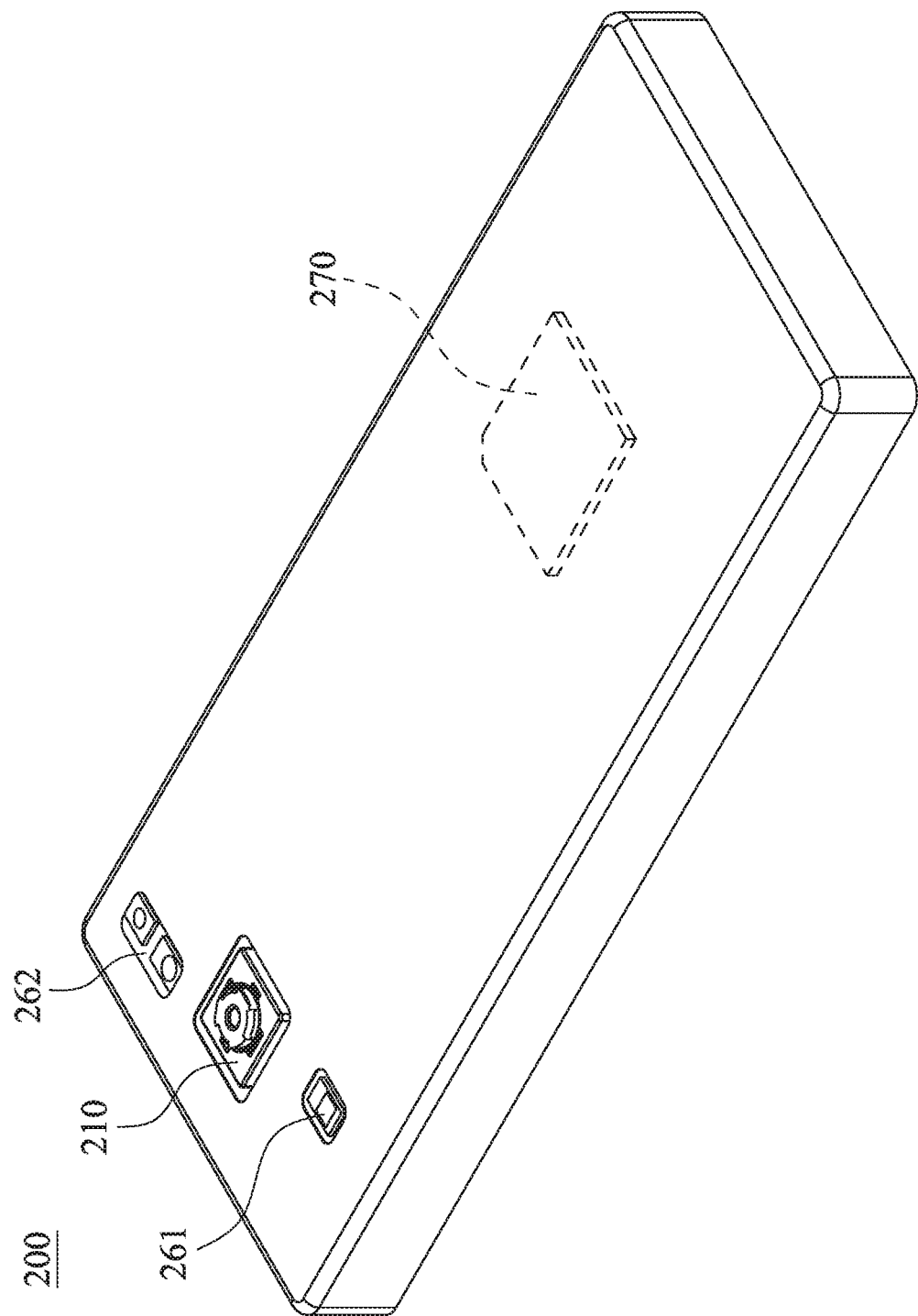
FIG. 6B shows another schematic view of the appearance of the electronic device according to the 2nd example.
Figure 6C:
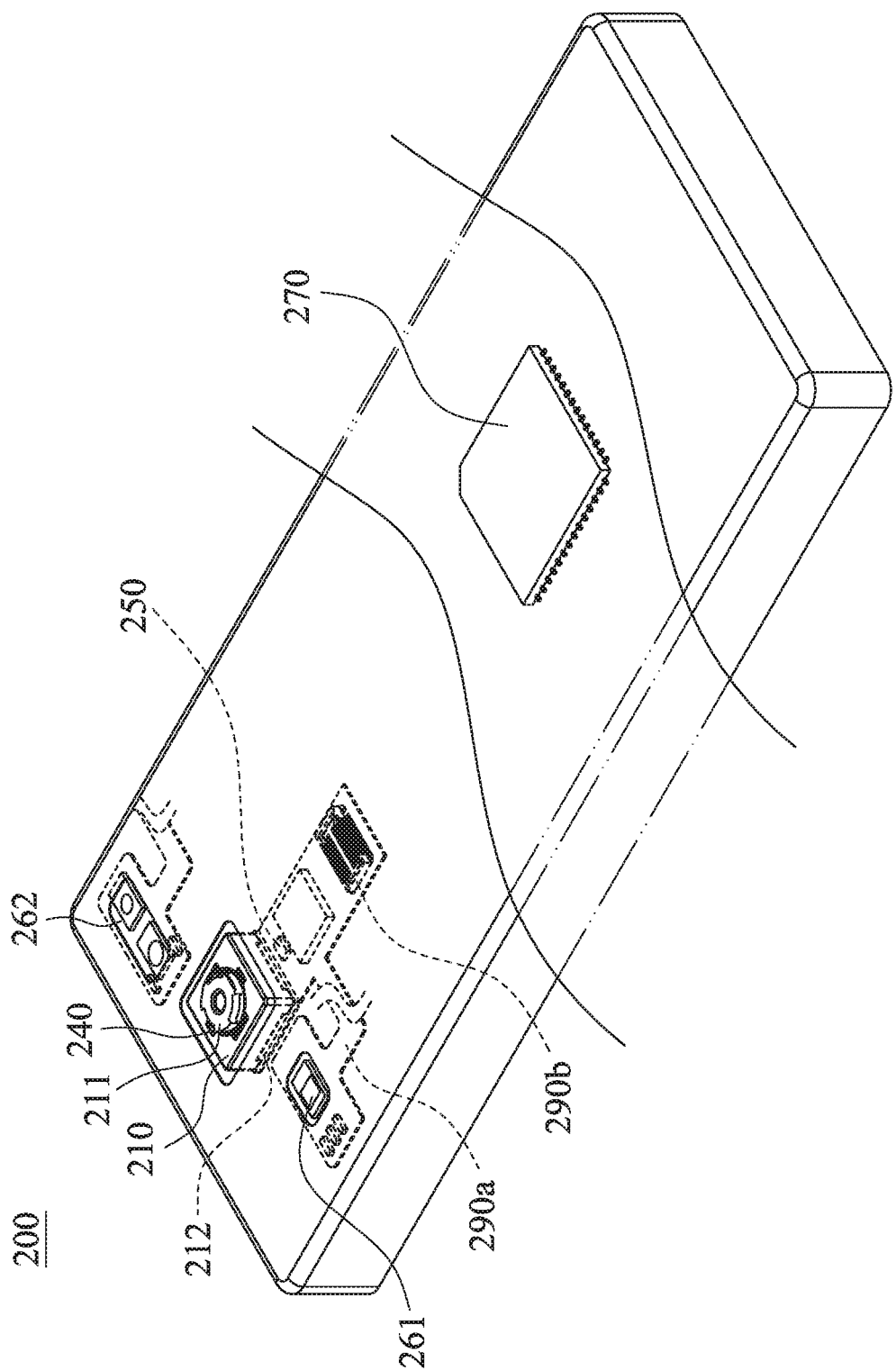
FIG. 6C shows a schematic view of the elements in the electronic device according to the 2nd example.
Figure 6D:
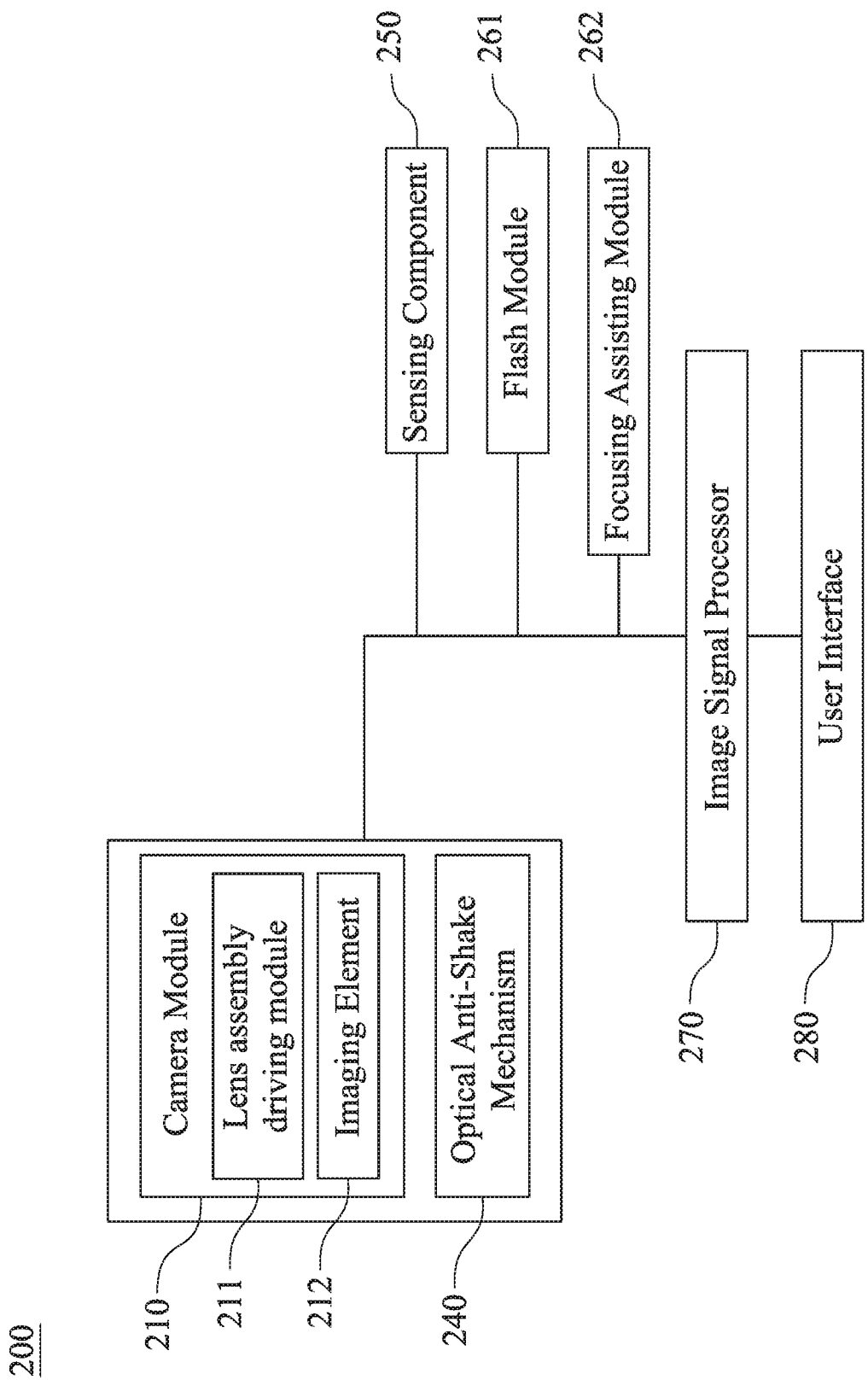
FIG. 6D is a block diagram of the electronic device according to the 2nd example.

FIG. 6A shows a schematic view of an appearance of an electronic device 200 according to the 2nd example of the present disclosure. FIG. 6B shows another schematic view of the appearance of the electronic device 200 according to the 2nd example. FIG. 6C shows a schematic view of the elements in the electronic device 200 according to the 2nd example. FIG. 6D is a block diagram of the electronic device 200 according to the 2nd example. In FIG. 6A, FIG. 6B, FIG. 6C and FIG. 6D, the electronic device 200 according to the 2nd example is a smartphone. The electronic device 200 includes a camera module 210, wherein the camera module 210 includes a lens assembly driving module 211 according to the present disclosure and an imaging element 212, and the imaging element 212 can be connected to a base (not shown in drawings) of the lens assembly driving module 211. The lens assembly driving module 211 can receive at least one optical lens element (not shown in drawings) and can provide the auto-focusing function to the camera module 210. In detail, according to the 2nd example, the lens assembly driving module 211 can be any one of the lens assembly driving modules in the aforementioned embodiments and example, and will not be limited thereto. Therefore, it is favorable for satisfying requirements of the mass production and appearance of the camera module applied to the electronic device nowadays.

Specifically, the user activates the capturing mode by the user interface 280 of the electronic device 200, wherein the user interface 280 of the 2nd example can be a touch screen 280a, a button 280b, etc. At this moment, the lens assembly driving module 211 collects imaging light on the imaging element 212 and outputs electronic signals associated with images to an image signal processor (ISP) 270.

In response to the camera specifications of the electronic device 200, the electronic device 200 may further include an optical anti-shake mechanism 240, such as an OIS anti-shake feedback device. Furthermore, the electronic device 200 can further include at least one auxiliary optical element (its reference numeral is omitted) and at least one sensing component 250. According to the 2nd example, the auxiliary optical element can be a flash module 261 and a focusing assisting module 262, wherein the flash module 261 compensates for color temperature, the focusing assisting module 262 can be an infrared ranging component, a laser focusing module, etc. The sensing component 250 can have a function of sensing physical momentum and actuation energy, such as an accelerometer, a gyroscope, and a Hall Effect Element to sense the shaking and shaking applied by the user's hand or the external environment. Further, the autofocus function and the optical anti-shake mechanism 240 configured by the camera module 210 in the electronic device 200 are facilitated to obtain good imaging quality, and the electronic device 30 according to the present disclosure has a plurality of modes of shooting functions, such as optimized self-timer, low light source HDR (High Dynamic Range imaging), high resolution 4K (4K Resolution) video. Moreover, the user can directly view the camera's shooting screen from the touch screen and manually operate the viewing range on the touch screen to achieve the autofocus function of what you see is what you get.

Moreover, in FIG. 6C, the camera module 210, the optical anti-shake mechanism 240, the sensing component 250, the flash module 261, and the focusing assisting module 262 can be disposed on a flexible printed circuitboard (FPC) 290a and electrically connected with the associated elements, such as an image signal processor 270, via a connector 290b to perform a capturing process. Since the current electronic devices, such as smartphones, have a tendency of being light and thin, the way of firstly disposing the camera module and related elements on the flexible printed circuitboard and secondly integrating the circuit into the main board of the electronic device via the connector can satisfy the mechanical design of the limited space inside the electronic device and the layout requirements and obtain more margins. The auto focus function of the camera module can be controlled more flexibly via the touch screen of the electronic device. In other examples (not shown in drawings), the sensing component s and the auxiliary optical elements can also be disposed on the main board of the electronic device or carrier boards in other forms according to requirements of the mechanical design and the circuit layout.

Furthermore, the electronic device 200 can further include, but not be limited to, a display, a control unit, a storage unit, a random access memory, a read-only memory, or the combination thereof.

3rd EXAMPLE

Figure 7:
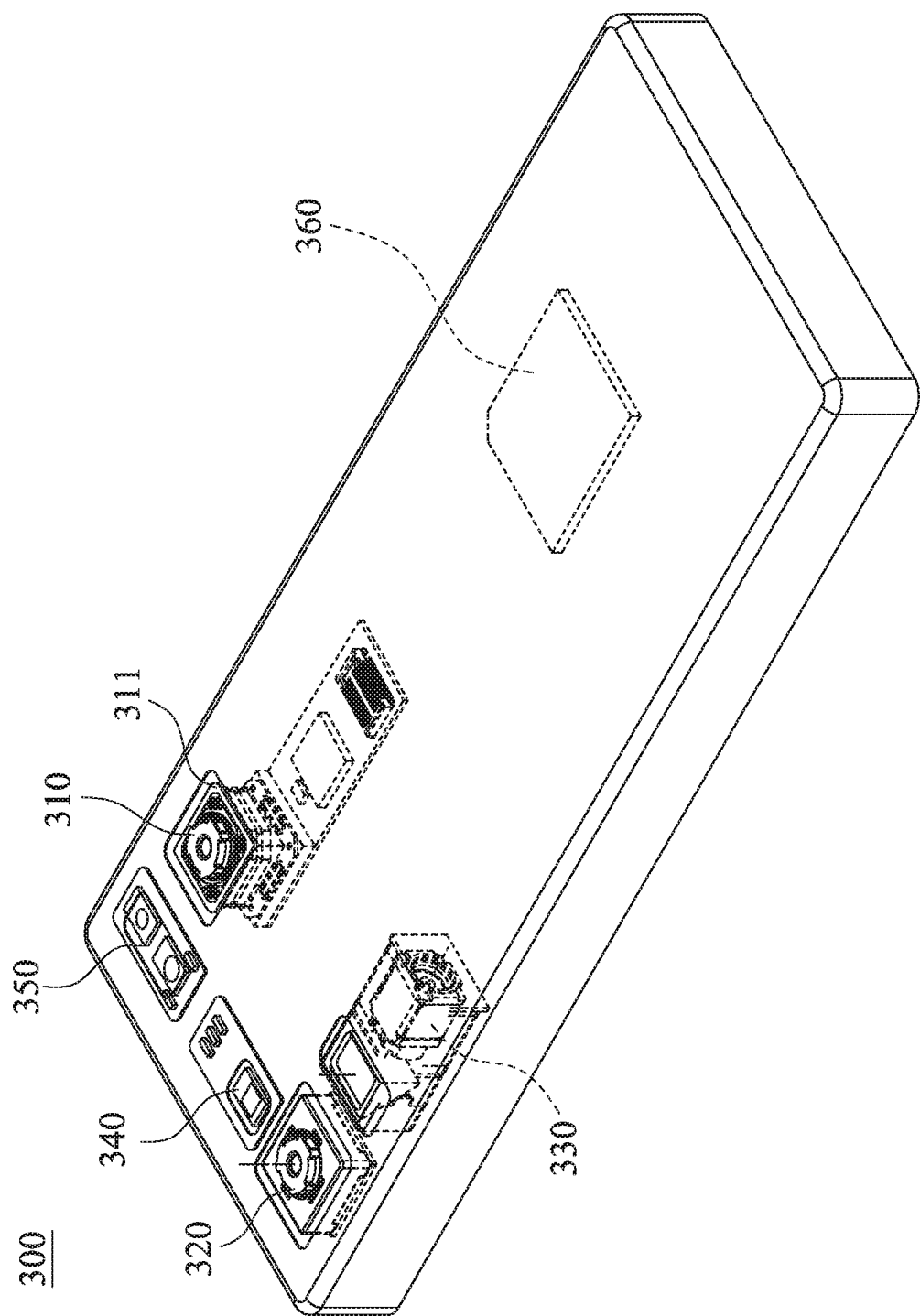
FIG. 7 is a schematic view of one side of an electronic device according to the 3rd example of the present disclosure.

FIG. 7 is a schematic view of one side of an electronic device 300 according to the 3rd example of the present disclosure. In FIG. 7, the electronic device 300 according to the 3rd example is a smartphone, wherein the electronic device 300 includes three camera modules 310, 320, 330, a flash module 340, a focusing assisting module 350, an image signal processor 360, a user interface (not shown in drawings) and an image software processor (not shown in drawings), wherein all of the three camera modules 310, 320, 330 face toward the same side (that is, object side). When the user captures images of an imaged object (not shown in drawings) via the user interface, the electronic device 300 focuses and generates an image via the camera modules 310, 320, 330 while compensating for low illumination via the flash module 340 when necessary. Then, the electronic device 300 quickly focuses on the imaged object according to its object distance information provided by the focusing assisting module 350, and optimizes the image via the image signal processor 360 and the image software processor. Thus, the image quality of the camera modules 310, 320, 330 can be further enhanced. The focusing assisting module 350 can adopt conventional infrared or laser for obtaining quick focusing, and the user interface can utilize a touch screen or a physical button for capturing and processing the image with various functions of the image processing software.

According to the 3rd example, the three camera modules 310, 320, 330 can include any one of the lens assembly driving modules in the aforementioned embodiments and example, and will not be limited thereto.

Furthermore, an optical anti-shake mechanism 311 is disposed on an outer side of the camera module 310, such as an OIS anti-shake feedback device. The camera module 330 can be telephoto lens assembly, and the present disclosure will not be limited thereto.

4th EXAMPLE

Figure 8:
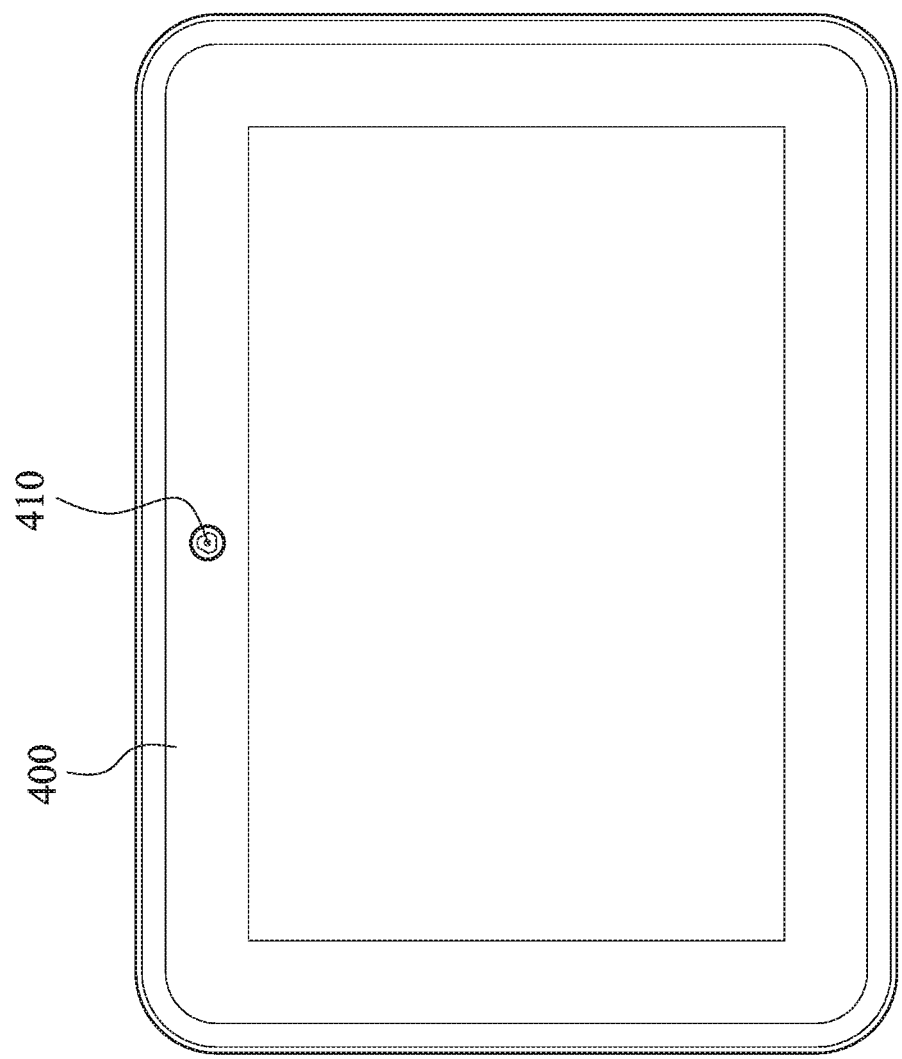
FIG. 8 is a schematic view of an electronic device according to the 4th example of the present disclosure.

FIG. 8 is a schematic view of an electronic device 400 according to the 4th example of the present disclosure. The electronic device 400 of the 4th example is a tablet. The electronic device 400 includes a camera module 410, wherein the camera module 410 includes a lens assembly driving module (not shown in drawings) according to the present disclosure and an imaging element (not shown in drawings), and the imaging element can be disposed on a base of the lens assembly driving module. The lens assembly driving module can receive at least one optical lens element (not shown in drawings) and can provide the auto-focusing function to the camera module 410.

5th EXAMPLE

Figure 9:
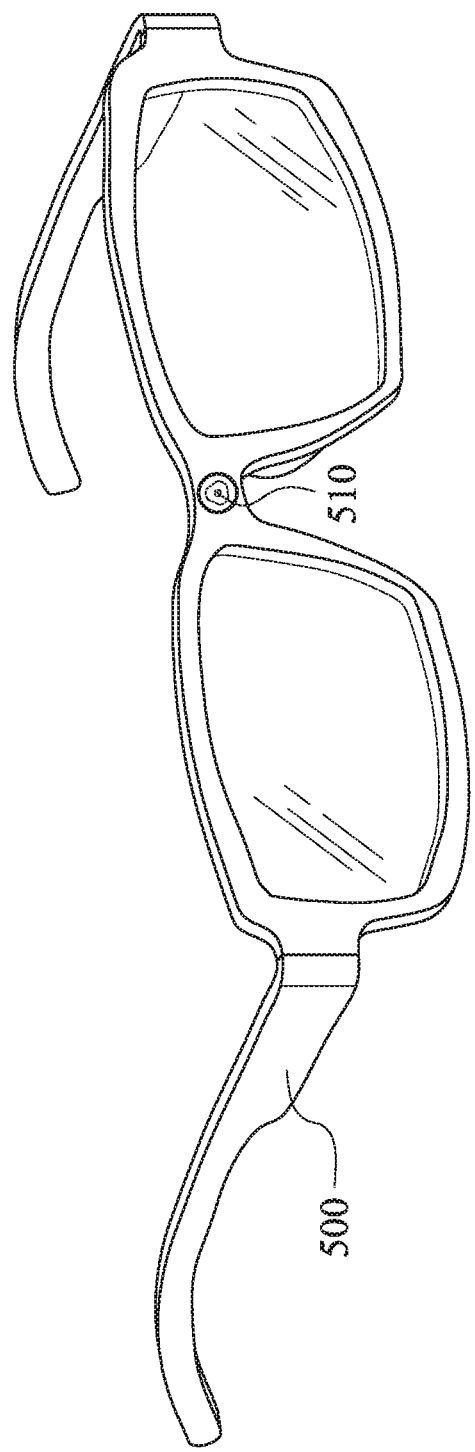
FIG. 9 is a schematic view of an electronic device according to the 5th example of the present disclosure.
Figure 10:
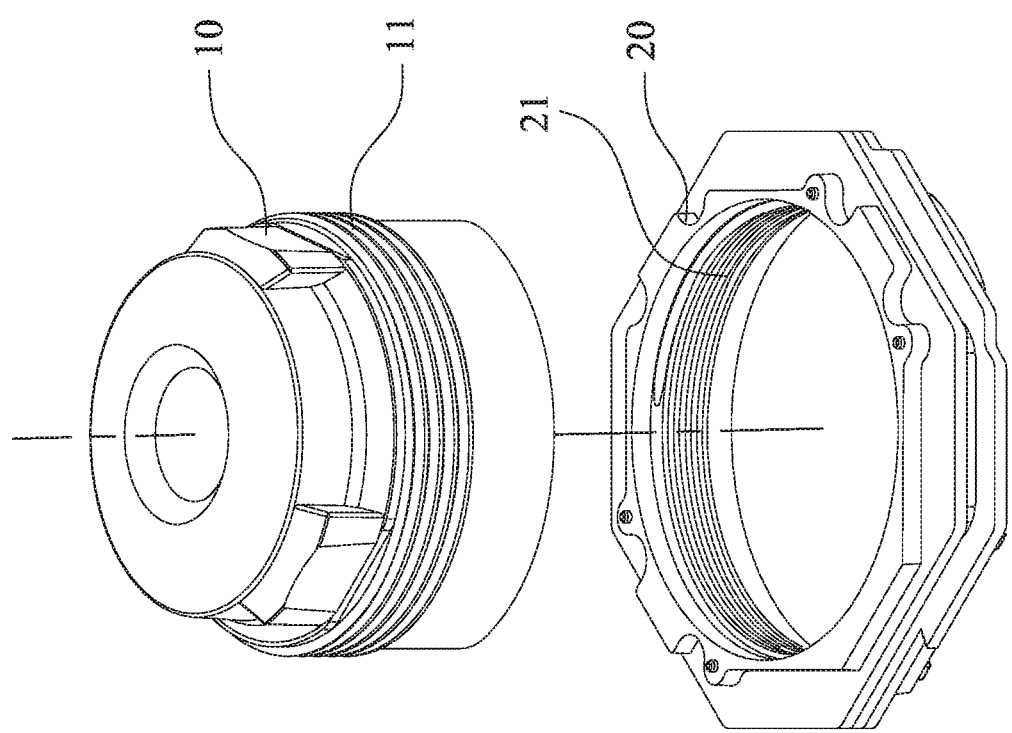
FIG. 10 is a schematic view of a lens barrel and a carrier of a conventional lens assembly driving module which is applicable to a camera module.

FIG. 9 is a schematic view of an electronic device 500 according to the 5th example of the present disclosure. The electronic device 500 of the 5th example is a wearable device. The electronic device 500 includes a camera module 510, wherein the camera module 510 includes a lens assembly driving module (not shown in drawings) according to the present disclosure and an imaging element (not shown in drawings), and the imaging element can be disposed on a base of the lens assembly driving module. The lens assembly driving module can receive at least one optical lens element (not shown in drawings) and can provide the auto-focusing function to the camera module 510.

The foregoing description, for purpose of explanation, has been described with reference to specific embodiments and examples. The embodiments and examples were chosen and described in order to best explain the principles of the disclosure and its practical applications, to thereby enable others skilled in the art to best utilize the disclosure and various embodiments and examples with various modifications as are suited to the particular use contemplated. The embodiments and examples depicted above and the appended drawings are exemplary and are not intended to be exhaustive or to limit the scope of the present disclosure to the precise forms disclosed. Many modifications and variations are possible in view of the above teachings.

What is claimed is:

1. A lens assembly driving module, comprising:
a base having a central opening and comprising:
at least two upright wall structures surrounding the central opening;
a cover coupled to the base and having an opening, the opening corresponding to the central opening of the base;
a lens carrier integrally formed with a plastic barrel into a coaxial unitary element, wherein the coaxial unitary element has an internal space for receiving at least one optical lens element, and the coaxial unitary element comprises:
at least two protrusion portions located on one end of the coaxial unitary element close to the base; and
a damping agent filled between each of the at least two upright wall structures and each of the at least two protrusion portions;
wherein the at least two protrusion portions are a part of the coaxial unitary element, and a distance in a direction perpendicular to an optical axis between the part of the coaxial unitary element and the internal space is a maximum distance among distances in the direction perpendicular to the optical axis between other parts of the coaxial unitary element and the internal space.

2. The lens assembly driving module of claim 1, wherein each of the at least two upright wall structures is stripe-shaped, the at least two upright wall structures have an even height, and located on one side of the base facing toward the coaxial unitary element.

3. The lens assembly driving module of claim 1, wherein a number of the protrusion portions is at least three, and each of the protrusion portions comprises a gate structure.

4. The lens assembly driving module of claim 3, wherein the gate structure of each of the protrusion portions comprises a recess structure and a gate trace, and the recess structure surrounds the gate trace.

5. The lens assembly driving module of claim 3, wherein all of the gate structures face toward the base.

6. The lens assembly driving module of claim 1, further comprising:
a focusing driving assembly for driving the coaxial unitary element to move along the optical axis, and comprising:
a focusing coil connected on the coaxial unitary element;
at least one permanent magnet having a first surface facing toward the focusing coil;
a magnet bracket surrounding the coaxial unitary element and for positioning the permanent magnet;
an upper spring leaf disposed on one end of the magnet bracket close to the cover along the optical axis; and
a lower spring leaf disposed on the other end of the magnet bracket close to the base along the optical axis;
wherein the upper spring leaf and the lower spring leaf are respectively connected to the coaxial unitary element, and are for supporting the coaxial unitary element to be moved along a direction parallel to the optical axis.

7. The lens assembly driving module of claim 6, wherein the focusing coil is connected to the end of the coaxial unitary element close to the base.

8. The lens assembly driving module of claim 6, further comprising:
an optical image stabilizable assembly for driving the focusing driving assembly to move along at least one of a second direction and a third direction which are perpendicular to the optical axis, wherein the second direction and the third direction are perpendicular to each other, and the optical image stabilizable assembly comprises:
a plurality of suspension wires, one end of each of the suspension wires connected to the upper spring leaf, the other end of each of the suspension wires connected to the base; and
an optical image stabilizable coil disposed on one end of the base facing toward the coaxial unitary element;
wherein the at least one permanent magnet has a second surface, the second surface faces toward the base, and the optical image stabilizable coil faces toward the second surface.

9. The lens assembly driving module of claim 8, wherein the optical image stabilizable coil comprises a plurality of notch structures, which corresponds to the at least two upright wall structures.

10. An electronic device, comprising:
the lens assembly driving module of claim 1.

11. A lens assembly driving module, comprising:
a base having a central opening;
a cover coupled to the base and having an opening, the opening corresponding to the central opening of the base;
a lens carrier integrally formed with a plastic barrel into a coaxial unitary element, wherein the coaxial unitary element has an internal space for receiving at least one optical lens element, and the coaxial unitary element comprises:
  at least three protrusion portions located on one end of the coaxial unitary element close to the base, and each of the protrusion portions comprising a gate structure; and
a damping agent filled between the base and one surface of each of the protrusion portions;
wherein the at least three protrusion portions are a part of the coaxial unitary element, and a distance in a direction perpendicular to an optical axis between the part of the coaxial unitary element and the internal space is a maximum distance among distances in the direction perpendicular to the optical axis between other parts of the coaxial unitary element and the internal space.

12. The lens assembly driving module of claim 11, wherein each of the gate structures is located on the surface of each of the protrusion portions.

13. The lens assembly driving module of claim 12, wherein each of the gate structures comprises a recess structure and a gate trace, the recess structure surrounds the gate trace, and the damping agent is applied on the recess structure.

14. The lens assembly driving module of claim 13, further comprising:
  a focusing driving assembly for driving the coaxial unitary element to move along the optical axis, and comprising:
  a focusing coil connected on the coaxial unitary element;
  at least one permanent magnet having a first surface facing toward the focusing coil;
  a magnet bracket surrounding the coaxial unitary element and for positioning the permanent magnet;
  an upper spring leaf disposed on one end of the magnet bracket close to the cover along the optical axis; and
  a lower spring leaf disposed on the other end of the magnet bracket close to the base along the optical axis;
  wherein the upper spring leaf and the lower spring leaf are respectively connected to the coaxial unitary element, and are for supporting the coaxial unitary element to be moved along a direction parallel to the optical axis.

15. The lens assembly driving module of claim 14, wherein the focusing coil is connected to the end of the coaxial unitary element close to the base.

16. The lens assembly driving module of claim 14, further comprising:
  an optical image stabilizable assembly for driving the focusing driving assembly to move along at least one of a second direction and a third direction which are perpendicular to the optical axis, wherein the second direction and the third direction are perpendicular to each other, and the optical image stabilizable assembly comprises:
    a plurality of suspension wires, one end of each of the suspension wires connected to the upper spring leaf, the other end of each of the suspension wires connected to the base; and
    an optical image stabilizable coil disposed on one end of the base facing toward the coaxial unitary element;
  wherein the at least one permanent magnet has a second surface, the second surface faces toward the base, and the optical image stabilizable coil faces toward the second surface.

17. The lens assembly driving module of claim 16, wherein,
  the base comprises a plurality of upright wall structures located on one end of the base facing toward the coaxial unitary element;
  the optical image stabilizable coil comprises a plurality of notch structures, which are corresponding to the upright wall structures.

* * * * *